United States Patent
Fujimoto et al.

(10) Patent No.: US 11,884,596 B2
(45) Date of Patent: Jan. 30, 2024

(54) METHOD FOR PRODUCING GRANULES FOR CERAMIC PRODUCTION

(71) Applicant: TOKUYAMA CORPORATION, Shunan (JP)

(72) Inventors: Hironobu Fujimoto, Shunan (JP); Tsuyoshi Ikeda, Shunan (JP)

(73) Assignee: TOKUYAMA CORPORATION, Shunan (JP)

( * ) Notice: Subject to any disclaimer, the term of this patent is extended or adjusted under 35 U.S.C. 154(b) by 478 days.

(21) Appl. No.: 17/256,114

(22) PCT Filed: Jun. 24, 2019

(86) PCT No.: PCT/JP2019/024893
§ 371 (c)(1),
(2) Date: Dec. 24, 2020

(87) PCT Pub. No.: WO2020/004304
PCT Pub. Date: Jan. 2, 2020

(65) Prior Publication Data
US 2021/0221745 A1     Jul. 22, 2021

(30) Foreign Application Priority Data

Jun. 28, 2018   (JP) .................. 2018-123425

(51) Int. Cl.
*C04B 35/626* (2006.01)
*C04B 35/581* (2006.01)
(Continued)

(52) U.S. Cl.
CPC ...... *C04B 35/62695* (2013.01); *C04B 35/581* (2013.01); *C04B 35/62625* (2013.01);
(Continued)

(58) Field of Classification Search
CPC ............ C04B 35/581; C04B 35/62695; C04B 35/62625; B01D 1/18; B01J 2/04; B01J 2/16
See application file for complete search history.

(56) References Cited

U.S. PATENT DOCUMENTS 3,567,513 A * 3/1971 Hansen ...................... B01J 2/30
127/62
4,451,330 A * 5/1984 Vitner ...................... B01D 1/18
159/48.2
(Continued)

FOREIGN PATENT DOCUMENTS

CN    103230842 A    8/2013
CN    104556988 A    4/2015
(Continued)

OTHER PUBLICATIONS

Translation of JP 2002293650 (Year: 2023).*
(Continued)

*Primary Examiner* — Mary Lynn F Theisen
(74) *Attorney, Agent, or Firm* — Birch, Stewart, Kolasch & Birch, LLP

(57) ABSTRACT

The present invention aims to provide a method for producing granules for ceramic production, the method having high productivity and making it possible to obtain a ceramic which, when produced by press molding the granules and firing the resulting press molded product, has physical properties kept from lowering. The present invention is characterized by including: a slurry preparation step of preparing a slurry including a mixture containing a powder of an inorganic compound, a binder, and a solvent; a granulation step of introducing the slurry into a spray drying device to form a granulated substance containing the inorganic compound; an exhaust step of exhausting an atmospheric gas within the spray drying device via a cyclone
(Continued)

having a surface made of ceramic; and a step of mixing a fine powder, which has been recovered by the cyclone during the exhaust step, with the granulated substance obtained in the granulation step.

4 Claims, 1 Drawing Sheet

(51) Int. Cl.
*B01D 1/18* (2006.01)
*B01J 2/04* (2006.01)
(52) U.S. Cl.
CPC .................. *B01D 1/18* (2013.01); *B01J 2/04* (2013.01); *C04B 2235/5436* (2013.01)

(56) References Cited

U.S. PATENT DOCUMENTS

| | | | |
|---|---|---|---|
| 5,182,239 A | 1/1993 | Hirokawa et al. | |
| 2014/0260211 A1* | 9/2014 | Patchett | F01N 3/027 60/297 |
| 2016/0184387 A1 | 6/2016 | Charmot et al. | |

FOREIGN PATENT DOCUMENTS

| | | |
|---|---|---|
| CN | 104628366 A | 5/2015 |
| CN | 106082993 A | 11/2016 |
| JP | 3-48123 B2 | 7/1991 |
| JP | 3-155101 A | 7/1991 |
| JP | 6-144918 A | 5/1994 |
| JP | 2525074 B2 | 8/1996 |
| JP | 11-302081 A | 11/1999 |
| JP | 2002-293650 A | 10/2002 |
| JP | 3479160 B2 | 12/2003 |
| JP | 2004-292178 A | 10/2004 |
| JP | 2005-89251 A | 4/2005 |

OTHER PUBLICATIONS

Chinese Office Action for corresponding Chinese Application No. 201980043534.3, dated Apr. 22, 2022, with a partial English translation.

Extended European Search Report for corresponding European Application No. 19827459.9, dated Feb. 24, 2022.

International Search Report for PCT/JP2019/024893 dated Aug. 13, 2019.

\* cited by examiner

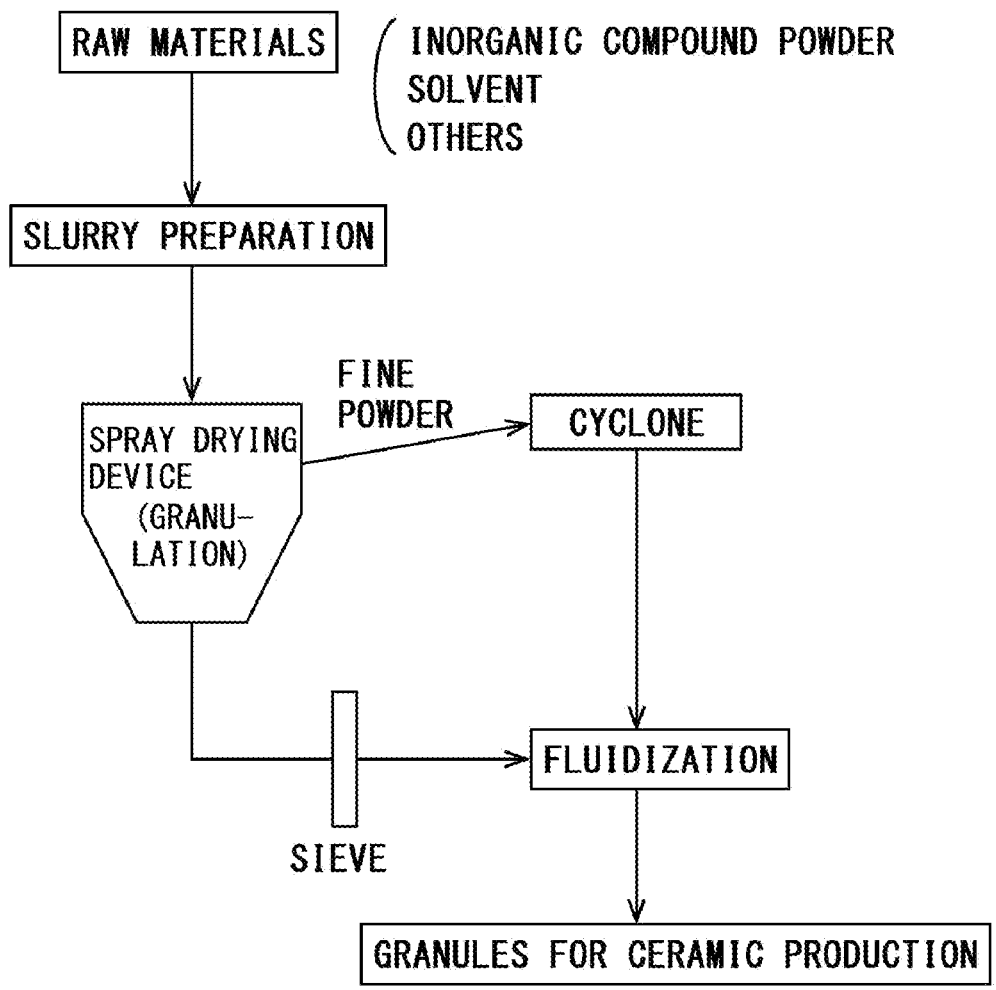

METHOD FOR PRODUCING GRANULES FOR CERAMIC PRODUCTION

TECHNICAL FIELD

This invention relates to a method for producing granules for ceramic production, the granules containing an inorganic compound, for example, aluminum nitride, as particles for sintering.

BACKGROUND ART

An inorganic material typified by aluminum nitride is turned into a slurry containing a solvent, and if necessary, a binder, etc. The slurry is formed into a granular product by spray drying, and the granular product is fired for solidification to obtain a sintered body, namely, a ceramic. The ceramic is put to various uses. For example, a ceramic made of aluminum nitride shows high thermal conductivity and high insulation, and is thus used widely for applications, such as heat dissipation substrates or electronic circuit boards of electrical appliances, as a heat dissipating material or an electrical insulating material (Patent Documents 1 and 2).

A granular formed product as mentioned above, in particular, has a uniform particle diameter, and is thus suitable for molding into a predetermined shape by press molding. By firing the resulting molded product, a ceramic of a desired shape can be obtained.

In the aforementioned production of granules by spray drying, the granulated granules are collected from a lower part of a spray drying device, while a fine powder is discharged from the spray drying device together with an exhaust and caught in a cyclone and on a bag filter.

The above fine powder occurs upon a collision between the granules during drying in the spray drying device, and upon formation of tiny liquid droplets produced during spraying of the slurry. When granules with a particle diameter of 100 µm or less are to be created, in particular, the amount of the fine powder is relatively increased, thus posing the problem of decreasing the yield of the resulting granules. A remedy is required to this problem.

PRIOR ART DOCUMENTS

Patent Documents

Patent Document 1: Japanese Patent No. 3479160
Patent Document 2: Japanese Patent No. 2525074

SUMMARY OF THE INVENTION

Problems to be Solved by the Invention

An object of the present invention is, therefore, to provide a method for producing granules for ceramic production, the method being excellent in productivity.

Means for Solving the Problems

According to the present invention, there is provided a method for producing granules for ceramic production, including:
a slurry preparation step of preparing a slurry including a mixture containing a powder of an inorganic compound and a solvent;
a granulation step of introducing the slurry into a spray drying device to form a granulated substance containing the inorganic compound;
an exhaust step of exhausting an atmospheric gas within the spray drying device via a cyclone having a surface made of ceramic; and
a step of mixing the fine powder, which has been recovered by the cyclone in the exhaust step, with the granulated substance obtained in the granulation step.

In the present invention, aluminum nitride is suitably used as the inorganic compound.

Effects of the Invention

With the method for producing granules according to the present invention, the product to be excluded as the fine powder is recovered, and mixed with the resulting granules to obtain a final product. By so doing, it becomes possible to provide a method for producing granules for ceramic production, the method being markedly improved in yield.

The method for production of the present invention is maximally characterized by the technology for recovery of the fine powder, and by the mixing of the recovered fine powder with the granules.

The present inventors paid attention to the contamination of the fine powder by the cyclone used in the recovery of the fine powder. By constructing the inner surface of the cyclone from ceramic, they succeeded in recovering a minimally contaminated fine powder. They also investigated the influence of addition of the fine powder to the granulated substance obtained by spray drying. As a result, they confirmed an increase in the tamped bulk density (heavily loaded bulk density) of the resulting granules for ceramic production, not only leading to an improvement in chargeability into a mold, but also exerting little influence on the properties or appearance of a sintered body obtained by sintering after molding. Since the amounts of metallic impurities contained in the fine powder and consisting mainly of iron were small, moreover, the iron content in the granules after being mixed with the fine powder could be maintained at 20 ppm or less.

Such granules for ceramic production are capable of effectively avoiding a decrease in sinterability or aggravation of appearance due to contamination with the metallic impurities. Besides, these granules contain a large amount of a particulate component derived from the fine powder, so that their tamped bulk density is increased. Consequently, when the granules are subjected to press molding, the resulting press molded article is a dense one with small interparticle gaps. When a ceramic is prepared by sintering such a press molded article heated at a high temperature, variations in sinterability due to the interparticle gaps are effectively suppressed, and a ceramic having stable physical properties can be obtained.

BRIEF DESCRIPTION OF THE DRAWINGS

FIG. 1 is a flowchart showing the process of a method for producing granules for ceramic production according to the present invention.

MODE FOR CARRYING OUT THE INVENTION

By reference to a flowchart in FIG. 1, a manufacturing process for granules for ceramic production according to the present invention includes, roughly, a step of providing as raw materials a powder of an inorganic compound as a sintering material, a solvent, and optional materials to be used as appropriate, and preparing a slurry with the use of these raw materials (slurry preparation step); a step of supplying the resulting slurry to a spray drying device to form a granulated substance (granulation step); and a step of fluidizing the resulting granulated substance, if necessary (fluidization step); and further a step of recovering particulates by means of a cyclone and mixing them with the granulated substance.

Raw Materials:

In the present invention, an inorganic compound for use as a starting material serves as a sintering material, and is a component for forming the skeleton of a ceramic to be produced finally. The inorganic compound conformed to the type of a desired ceramic is used.

The inorganic compound used is one with a low content of metallic impurities which may deteriorate the properties or appearance of a sintered body to be obtained. In particular, a high purity one with the content of iron, among the metallic impurities, kept down to 20 ppm or less is used. As long as such a high purity is maintained, any of various inorganic compounds is usable. Most preferred is the use of aluminum nitride for use in an electronic circuit board or the like of electronic equipment. Among them, aluminum nitride produced by reduction nitridation is used preferably as the inorganic compound with a low metallic impurity content.

A powder of the inorganic compound for use in the preparation of a slurry subjected to spray drying generally has an average particle diameter of 5 μm or less, especially of the order of 0.5 to 3 μm. This is preferred in obtaining granules having a uniform particle size distribution. This average particle diameter is measured, for example, using a particle size distribution measuring device by laser diffraction.

A solvent used together with the above inorganic compound powder is a component essential for slurry preparation and granulation by spray drying. Depending on the type of the inorganic compound, water or a volatile organic solvent is used.

The organic solvent can be exemplified by, but is not limited to, ketones such as acetone, methyl ethyl ketone, and methyl isobutyl ketone; alcohols such as ethanol, propanol, and butanol; aromatic hydrocarbons such as benzene, toluene, and xylene; or halogenated hydrocarbons such as trichloroethylene, tetrachloroethylene, and bromochloromethane. These organic solvents can also be used as mixtures of two or more of them.

Such a solvent is preferably used, for example, in such an amount that the viscosity at 20° C. of the resulting slurry is 0.02 to 2000 mPa·s. It is used, for example, in an amount of 20 to 200 parts by mass with respect to 100 parts by mass of the aforementioned inorganic compound powder.

Other components suitably used include, for example, publicly known compounding agents to be used for ceramic molding, e.g., binders, surface active agents, and sintering aids.

The binder is used for ceramic molding using granules. It is used to form a molded product of a predetermined shape without making the particles discrete, before performing sintering. It is a compounding agent hitherto known publicly.

Examples of such a binder are generally, but not limited to, polyvinyl acetals such as polyvinyl butyral; acrylic resins such as polymethyl methacrylate, polyethyl methacrylate, poly-2-ethylhexyl methacrylate, polybutyl methacrylate, polyacrylate, and cellulose acetate butyrate; oxygen-containing organic polymers such as nitrocellulose, methyl cellulose, hydroxymethyl cellulose, polyvinyl alcohol, polyoxyethylene oxide, and polypropylene oxide; hydrocarbon-based synthetic resins such as petroleum resin, polyethylene, polypropylene, and polystyrene; polyvinyl chlorides; and organic polymers such as waxes and emulsions thereof. These binders can be used as a mixture of two or more types.

As the above binder, polyvinyl acetal and acrylic resins are preferred. Their examples are S-LEC B manufactured by Sekisui Chemical Co., Ltd., Mowital produced by KURARAY CO., LTD., Aron Series produced by TOAGOSEI CO., LTD., Oricox KC Series produced by KYOEISHA CHEMICAL CO., LTD., NSK Series produced by Nissin Kasei Co., Ltd., and KWE Series produced by Taisei Fine Chemical Co., Ltd.

Such a binder is generally used in an amount of 0.1 to 30 parts by weight based on 100 parts by mass of the inorganic compound powder. This is preferred in effectively performing the molding before sintering.

The surface active agent is used to disperse the inorganic compound powder in the slurry uniformly, and a publicly known one can be used. Generally, a nonionic surface active agent having HLB in the range of 4.5 to 18, particularly 6.0 to 10.0, is used preferably.

Examples of such a nonionic surface active agent are carboxylated trioxyethylene tridecyl ether, diglycerin monooleate, diglycerin monostearate, carboxylated heptaoxyethylene tridecyl ether, tetraglycerin monooleate, hexaglycerinmonooleate, polyoxyethylenesorbitanmonolaurate, and polyoxyethylene sorbitan monooleate. These surface active agents can also be used as a mixture of two or more types.

The amount of such a surface active agent used is generally 0.01 to 10 parts by mass, particularly preferably 0.02 to 3.0 parts by mass, based on 100 parts by mass of the inorganic compound powder.

Furthermore, the sintering aid is used to promote sintering during ceramic production. Depending on the type of the inorganic compound powder, one publicly known per se can be used. If an aluminum nitride powder is used, for example, the preferred sintering aid is an alkali earth metal oxide such as calcium oxide or strontium oxide; an oxide of a rare earth element, such as yttrium oxide or lanthanum oxide; or a composite oxide such as calcium aluminate. This sintering aid is used in a proportion of 0.1 to 10% by mass with respect to the total amount of the aluminum nitride powder and the sintering aid.

Slurry Preparation:

The various raw materials mentioned above can be mixed using a public known mixing device. A tumbling mill typified by a ball mill is commonly used as the mixing device. By means of this device, a slurry having the inorganic compound powder uniformly distributed is obtained.

The resulting slurry is filtered, if necessary, to remove coarse particles in the slurry, and the rest is stored temporarily in a slurry tank.

The above filtration is performed generally by passing the slurry through a filtering medium with a mesh size of 10 to 100 μm.

In this manner, a slurry preferably having a viscosity at 20° C. of 0.02 to 2000 mPa·s is obtained.

Granulation by Spray Drying:

The slurry obtained as above is introduced into a spray drying device, where it is granulated. If aluminum nitride is used as the inorganic metal compound, this slurry is preferably supplied to the spray drying device through a magnet filter.

That is, the aluminum nitride powder is very rigid. Thus, transport piping for the materials including the aluminum nitride powder may wear, and wear debris may enter as impurities. For example, transport piping made of stainless steel is used, with the result that wear debris containing Fe, Ni, Cr, etc. may contaminate the slurry. By supplying the slurry through the magnet filter, therefore, such wear debris can be suitably removed from the slurry. Consequently, a disadvantage such that the content of metallic impurities in the resulting granules exceeds 20 ppm can be avoided effectively.

The removal of wear debris by means of the magnet filter can be performed even after granulation. After granulation, however, the efficiency of removal is low. Thus, it is preferred to remove wear debris through the magnet filter immediately before supply of the slurry to the spray drying device. This is because the passage of the slurry through the magnet filter can ensure intimate contact with the magnet filter in comparison with the passage of the granulated substance (particulate matter), obtained by granulation, through the magnet filter.

In the spray drying device according to the present invention, the prepared slurry is sprayed from its upper part into a dry gas stream (e.g., air or a nitrogen gas) heated as appropriate, whereby the solvent is removed to obtain a particulate substance containing the inorganic compound.

The method of spraying within the spray drying device comes in a nozzle type or a disk type. For ceramic granules with a relatively small particle diameter according to the present invention, the disk type is preferred.

In the present invention, the granulated substance obtained by granulation is collected from a lower part of the spray drying device, while a fine powder is discharged from the spray drying device together with an exhaust, and caught by a cyclone or a bag filter.

A method of collecting the total amount of the product directly with the use of the bag filter without mediation of the cyclone is also conceivable. In this case, however, the inventors have confirmed the problem that the granulated substance is deformed, or the fine powder sticks firmly to the surface, with the result that a product with a decreased tamped bulk density is obtained.

The fine powder caught by the cyclone has a particle diameter smaller than that of the granulated substance collected below the spray dryer, and its particle diameter is preferably 40 µm or less. A fine powder with an even smaller particle diameter, which cannot be caught by the cyclone, is captured by the bag filter.

The fine powder is mixed with the particulate matter obtained by the spray drying. The cyclone is of a configuration in which the fine powder is centrifuged, collided with the wall surface, then fallen by gravity, and accumulated below. Thus, the internal surface of the cyclone is apt to wear. Hence, the cyclone having a ceramic-coated inner surface is used. By so doing, the intrusion of metallic impurities into the fine powder recovered by the cyclone can be reliably prevented, so that the intrusion of metallic impurities when the fine powder is mixed with the particulate matter obtained by granulation can be effectively avoided. If aluminum nitride is used as the inorganic compound, coating with an aluminum nitride ceramic or an alumina ceramic is preferred.

The particulate matter withdrawn from the spray drying device is preferably deprived of coarse particles (e.g., particles with a particle diameter of 300 µm or more) by passage through a sieve (e.g., a vibrating sieve).

Mixing of Fine Powder:

In the present invention, the fine powder recovered by the cyclone as above is mixed with the granulated substance obtained in the above-mentioned manner. It is preferred to mix the fine powder so that the proportion of a fine particle component having a particle diameter of 40 µm or less is 10 to 25% by mass. This method of mixing is not restricted, but preferably is performed so as to concurrently serve for fluidization to be described later.

Fluidization:

The granulated substance incorporating the fine powder upon the above mixing is preferably fed to a step in which the granules (a mixture of the granulated substance and the fine powder) are allowed to dwell in a turbulent gas flow (fluidization step). This step is designed to improve flowability, enhance the strength of the granulated substance, and further uniformize the granulated substance and the fine powder recovered by the cyclone.

Aluminum nitride granules will be taken as an example of the granules for ceramic production. A gas for use in fluidizing the granules is preferably a gas which substantially does not react with an aluminum nitride powder or an additive such as a binder. Examples of the gas are air, oxygen, and nitrogen. The wind velocity of the gas supplied may be a wind velocity necessary for the fluidization of the granules. The wind velocity necessary for the fluidization of the granules is, for example, selected freely from the range of values calculated from the equation of incipient fluidization velocity described on page 176 and the equation of terminal fluidization velocity described on page 1056 of "A Handbook of Chemical Engineering, 4th revised edition" edited by the Society of Chemical Engineers, Japan. The dwell time of the granulated substance is preferably selected from the range of 1 minute to 36 hours. The temperature of the gas fed may be any temperature, but is preferably selected from the range of 0 to 250° C. in order to obtain aluminum nitride granules having appropriate breaking strength. The fluidization step uniformly mixes the granulated substance collected from below the spray dryer and the fine powder caught by the cyclone. Also, the fluidity and strength of the granulated substance can be adjusted.

The fluidization step is generally performed batchwise using a device equipped with a fluidized bed. In the granulation step by spray drying for supplying the granulated substance to the fluidization step, on the other hand, it is preferred that operation be performed continuously because of the operational convenience of the device. In this case, in order to avoid the execution of the operation in the granulation step batchwise in conformity with the fluidization step, a hopper or a tank serving as a buffer may be provided between the granulation step and the fluidization step. By so doing, with the granulation step being performed continuously, the fluidization step can be carried out in batches. This embodiment is also preferred.

Granules obtained via the fluidization step are sieved as appropriate, whereby coarse particles are further removed. The rest is collected as granules for ceramic production according to the present invention, the granules having a predetermined average particle diameter and a predetermined particulate content.

Granules for Ceramic Production:

The granules for ceramic production, which are manufactured by the method of the present invention, are of very high purity, as demonstrated by a metallic impurity content of 0.1% by mass or less based on the inorganic compound. The content of iron, one of the metallic impurities, in particular, can be kept down to 20 ppm or less calculated as element. Thus, the deterioration of the properties or appearance of the resulting sintered body due to the metallic impurities can be prevented effectively.

Moreover, the adjustment of the manufacturing conditions for the granulated substance, the adjustment of the mixed amount of the fine powder, and so on are performed so that the average particle diameter of the granules for ceramic production will fall within the range of 60 to 100 μm. So doing is preferred for the purpose of obtaining granules for ceramic production suitable for press molding. That is, the fine powder contained together with the granulated substance functions as granules with small particle diameters, and fills in the gaps between large particles. Thus, the so obtained granules are very suitable for sintering after press molding. That is, when such granules are charged into a predetermined mold and press-molded, the resulting press molded product has the particles closely bonded together. During subsequent sintering by high-temperature heating, therefore, a decrease in sinterability due to the presence of gaps can be avoided effectively.

In the present invention, the average particle diameter of particles and the particulate component content in the granules are measuredly the laser diffraction scattering method.

The granules for ceramic production according to the present invention are molded into a desired shape, for example, by press molding after being charged into a predetermined mold. Then, the molded product is sintered by heating conformed to the type of the inorganic compound used (e.g., heating at 600° C. or above in the case of aluminum nitride). Consequently, decreases in various characteristics due to poor sintering can be effectively avoided, and a ceramic having stable properties can be obtained.

When an aluminum nitride powder is used as an inorganic compound powder among the raw materials, therefore, a ceramic as a final product is of very high quality, and is widely used as a circuit board or a heat dissipation plate of various electronic equipment.

EXAMPLES

Examples and Comparative Example will be cited below to describe the present invention more concretely. However, the present invention is in no way limited to these examples.

Measurements of various physical properties in these Examples and Comparative Example were conducted by the following methods:

(1) Average Particle Diameter of Aluminum Nitride Powder

The average particle diameters of an aluminum oxide powder, an aluminum nitride powder, and a powder mixture of aluminum nitride and aluminum oxide as an unreacted material were measured by dispersing a sample in an aqueous solution of sodium pyrophosphate by means of a homogenizer, and making a measurement on the dispersion by laser diffraction using MICROTRAC HRA manufactured by Nikkiso Co., Ltd.

(2) Specific Surface Area

The specific surface area of the aluminum nitride powder was measured by the BET method using FlowSorb 2300, an automated fluidized bed-type surface area measuring device manufactured by Shimadzu Corporation.

(3) Oxygen Content

The total oxygen content of the aluminum nitride powder was measured using EMGA-620 W, an in-ceramic oxygen/nitrogen analyzer manufactured by HORIBA, Ltd.

(4) Carbon Content

The carbon content of the aluminum nitride powder was determined using "EMIR-110", an in-metal carbon analyzer manufactured by HORIBA, Ltd., by burning the powder in an oxygen gas stream, and measuring the amounts of CO and $CO_2$ gases formed.

(5) Metallic Element Content of Aluminum Nitride Powder

The contents of metallic elements, other than aluminum, in the aluminum nitride powder were determined by adding 2 mL of nitric acid and 10 mL of phosphoric acid to 0.8 g of a sample, thermally decomposing the mixture for 20 minutes at 380° C., and making measurements by ICP emission spectroscopic analysis using ICPS-1000-II manufactured by Shimadzu Corporation.

(6) Average Particle Diameter of Granules

Measured by laser diffraction using MICROTRAC MT3300EX manufactured by Nikkiso Co., Ltd.

(7) Metallic Impurity Content of Aluminum Nitride Granules

The contents of metallic impurities in the aluminum nitride granules were determined using as a sample the granules degreased by 5 hours of heating at 600° C. To 0.8 g of the sample, 2 mL of nitric acid and 10 mL of phosphoric acid were added. The resulting mixture was thermally decomposed for 20 minutes at 380° C., and measured for metallic impurities by ICP emission spectroscopic analysis using ICPS-1000-II manufactured by Shimadzu Corporation.

(8) Tamped Bulk Density

The tamped bulk density was measured using "A.B.D Powder Characteristic Measuring Apparatus" manufactured by TSUTSUI SCIENTIFIC INSTRUMENTS CO., LTD.

(9) Density of press molded product

The density of the press molded product was calculated from the size and weight of the press molded product.

(10) Density of Sintered Body

Determined by the Archimedes method using "High Precision Specific Gravity Hydrometer D-H" manufactured by Toyo Seiki Seisaku-sho, Ltd.

(11) Volume Resistivity

Measured using R8340, a volume resistivity measuring apparatus manufactured by Advantest Corporation, by a method in compliance with JIS C2141.

(12) Thermal Conductivity

The thermal conductivity of the AlN sintered body prepared was measured by the laser flash method using LFA-502 manufactured by Kyoto Electronics Manufacturing Co., Ltd.

Example 1

A rotary ball mill with an internal volume of 500 L was charged with iron core-containing nylon balls, and was then charged with 120 kg of an aluminum nitride powder (H grade No. 1, a product of Tokuyama Corporation) shown in Table 1and produced by the reduction-nitridation method, 6 kg of yttrium oxide, 0.1 kg of hexaglycerin monooleate, 4 kg of butyl polymethacrylate, and 120 kg of a toluene solvent. The charged materials were thoroughly mixed in the ball mill to obtain a white slurry.

The resulting slurry was granulated by a spray dryer at an atomizer rotational speed of 5000 rpm. After completion of granulation, 100 kg of granules (granulated substance) collected below the spray dryer, and 25 kg of granules (fine powder) caught by the cyclone during granulation were introduced into a fluidized bed dryer. The introduced materials were fluidized for 2 hours at room temperature to prepare aluminum nitride granules. The interior of the cyclone had a coating with an alumina ceramic.

Example 2

Granulation was carried out in the same manner as in Example 1, except that the atomizer rotational speed was set at 8000 rpm. After completion of granulation, 88 kg of granules (granulated substance) collected below the spray dryer, and 35 kg of granules (fine powder) caught by the cyclone during granulation were introduced into the fluidized bed dryer. The introduced materials were fluidized for 2 hours at room temperature to prepare aluminum nitride granules.

Comparative Example 1

Granulation was carried out in the same manner as in Example 1, except that the cyclone was made of stainless steel and its interior was not coated with an alumina ceramic. After completion of granulation, 101 kg of granules (granulated substance) collected below the spray dryer, and 24 kg of granules (fine powder) caught by the cyclone during granulation were introduced into the fluidized bed dryer. The introduced materials were fluidized for 2 hours at room temperature to prepare aluminum nitride granules.

Reference Example 1

In the same manner as in Example 1, granulation was performed, and then 100 kg of granules (granulated substance) collected below the spray dryer were introduced into the fluidized bed dryer. The introduced material was fluidized for 2 hours at room temperature to prepare aluminum nitride granules.

The particle diameters and metallic impurities (Fe, Cr, Ni) of the granulated substance and the fine powder obtained in each of the above Examples, Comparative Example, and Reference Example were measured. The granules obtained by mixing the granulated substance and fine powder were measured for particle diameter, metallic impurities (Fe, Cr, Ni) and tamped bulk density. The results are shown in Table 2.

Furthermore, 30 g of the granules obtained by mixing the granulated substance and the fine powder were introduced into a mold with a diameter of 100 mm. The introduced granules were press molded at a pressure of 100 MPa to prepare a press molded product about 2=thick, whose press molding density was measured. Then, the press molded product was degreased for 5 hours at 580° C. in air. Then, the press molded product was placed in a carbon crucible with an inner surface coated with boron nitride, and fired in a nitrogen atmosphere for 5 hours at 1800° C. to obtain a sintered body. After the surface of the sintered body was polished, the sintered body was checked for appearance (whether discolored or not owing to contamination with metallic impurities), and measured for density, volume resistivity, and thermal conductivity. The results are shown in Table 2.

TABLE 1

| Item | Unit | AlN powder |
|---|---|---|
| Specific surface area | $m^2/g$ | 2.6 |
| Average particle diameter | μm | 1.1 |
| Oxygen concentration | % | 0.7 |
| Carbon concentration | ppm | 280 |
| Fe | ppm | 8 |
| Cr | ppm | undetectable |
| Ni | ppm | undetectable |
| Ca | ppm | 200 |
| Si | ppm | 20 |

TABLE 2

| | | | Ex. 1 | Ex. 2 | Comp. Ex. 1 | Reference Example* |
|---|---|---|---|---|---|---|
| Mixing ratio | below spray dryer | kg | 100 | 88 | 101 | 100 |
| | cyclone | kg | 25 | 35 | 24 | — |
| Granules collected below spray dryer | average particle diameter | μm | 90 | 75 | 91 | 90 |
| | proportion of 40 μm or less | % | 6 | 9 | 6 | 6 |
| | Fe | ppm | 12 | 12 | 12 | 12 |
| | Cr | ppm | undetectable | undetectable | undetectable | undetectable |
| | Ni | ppm | undetectable | undetectable | undetectable | undetectable |
| Granules recovered by cyclone | average particle diameter | μm | 38 | 36 | 37 | — |
| | proportion of 40 μm or less | % | 60 | 63 | 61 | — |
| | Fe | ppm | 11 | 11 | 70 | — |
| | Cr | ppm | undetectable | undetectable | 5 | — |
| | Ni | ppm | undetectable | undetectable | 2 | — |
| Granules after mixing | average particle diameter | μm | 85 | 67 | 85 | 90 |
| | proportion of 40 μm or less | % | 15 | 24 | 15 | 6 |
| | Fe | ppm | 12 | 12 | 23 | 12 |
| | Cr | ppm | undetectable | undetectable | 3 | undetectable |

TABLE 2-continued

|  |  |  | Ex. 1 | Ex. 2 | Comp. Ex. 1 | Reference Example* |
|---|---|---|---|---|---|---|
|  | Ni | ppm | undetectable | undetectable | 2 | undetectable |
|  | tamped bulk density | g/cm$^3$ | 1.07 | 1.05 | 1.06 | 1.01 |
|  | press molding density | g/cm$^3$ | 2.1 | 2.1 | 2.1 | 2.1 |
| Sintered body | density | g/cm$^3$ | 3.33 | 3.33 | 3.33 | 3.33 |
|  | volume resistivity | Ω · cm | $5.2 \times 10^{14}$ | $4.1 \times 10^{14}$ | $2.1 \times 10^{14}$ | $4.5 \times 10^{14}$ |
|  | thermal conductivity | W/m · K | 172 | 173 | 169 | 173 |
|  | appearance | — | satisfactory | satisfactory | point of color change present | satisfactory |

*The Reference Example did not mix the fine powder recovered by the cyclone.

The invention claimed is:

1. A method for producing granules for ceramic production, including:
    a slurry preparation step of preparing a slurry including a mixture containing a powder of an inorganic compound, a binder, and a solvent;
    a granulation step of introducing the slurry into a spray drying device to form a granulated substance containing the inorganic compound;
    an exhaust step of exhausting an atmospheric gas within the spray drying device via a cyclone having a surface made of ceramic; and
    a step of mixing a fine powder having a particle diameter smaller than that of the granulated substance, which has been recovered by the cyclone during the exhaust step, with the granulated substance obtained in the granulation step.

2. The method for producing granules for ceramic production according to claim 1, wherein the inorganic compound is aluminum nitride.

3. The method for producing granules for ceramic production according to claim 1, wherein the fine powder has a particle diameter of 40 μm or less.

4. The method for producing granules for ceramic production according to claim 2, wherein the fine powder has a particle diameter of 40 μm or less.

* * * * *